United States Patent [19]

Ueda et al.

[11] 4,414,636

[45] Nov. 8, 1983

[54] COLOR CONTROL SIMULATOR FOR A PICTURE REPRODUCING MACHINE

[75] Inventors: Sadao Ueda, Shiga; Isao Tokura, Uji; Mitsuhiko Yamada, Kyoto, all of Japan

[73] Assignee: Dainippon Screen Seizo Kabushiki Kaisha, Japan

[21] Appl. No.: 218,669

[22] Filed: Dec. 22, 1980

[30] Foreign Application Priority Data

Dec. 28, 1979 [JP] Japan ................................. 54-171134

[51] Int. Cl.³ .......................... G03F 3/08; H04N 1/46
[52] U.S. Cl. ....................................... 364/526; 358/80
[58] Field of Search ....................... 364/515, 521, 526; 358/80, 284; 340/701, 702, 703

[56] References Cited

U.S. PATENT DOCUMENTS

| | | | |
|---|---|---|---|
| 3,555,262 | 1/1971 | Shimada | 364/526 |
| 4,090,243 | 5/1978 | Kotera et al. | 364/526 |
| 4,127,871 | 11/1978 | Sakamoto | 358/80 |
| 4,305,094 | 12/1981 | Yamada | 358/80 |
| 4,307,962 | 12/1981 | Jung | 358/80 X |

*Primary Examiner*—Jerry Smith
*Attorney, Agent, or Firm*—John Cyril Malloy

[57] ABSTRACT

A color control simulator for a picture reproducing machine such as a color scanner and a color facsimile, wherein an input means such as a pickup head scans an original picture to obtain color separation picture signals which index a memory table stored in a memory to output first color-corrected color separation picture signals, wherein the first color-corrected color separation picture signals of the table are replaced with second color-corrected color separation picture signals which are output by a color control means such as a color controller and a key board, and wherein a display means displays colors corresponding to the color-corrected color separation picture signals fed from the memory. A computer controls the input means, the memory, the color control means, and the display means.

4 Claims, 2 Drawing Figures

COLOR CONTROL SIMULATOR FOR A PICTURE REPRODUCING MACHINE

BACKGROUND OF THE INVENTION

The present invention relates to a color control simulator for a picture reproducing machine such as a color scanner and a color facsimile, and more particularly relates to a color control simulator for determining color control conditions for reproducing a color reproduction picture by using the picture reproducing machine when color separation printing plates or films are prepared.

In a conventional method, when a color picture image is reproduced or printed by using color separation printing plates or films, the color separation picture signals for preparing the color separation printing plates or films, which are obtained by scanning an original picture by means of a pickup head, are usually color-controlled such as a density range correction, a color correction and a gradation correction, in order to reproduce faithful colors on a reproduction printed or to obtain a printing of the desired colors. The amounts of the color controls are determined in expectation of a proper color reproduction picture as the printing.

However, in a conventional method, the amounts of the color controls are set up according to experiences and knowledge of an operator. Hence the color finish of the reproduction picture is often varied depending on skillfullness and preferences of operators. Accordingly, in practice, it is difficult to decide the amounts of the color controls of the picture reproducing machine objectively.

Recently, in order to reduce the adjusting points of the operator as far as possible, an additional operational circuit has been added which is either the same type as the color scanner, or the operational circuit used by the color scanner, and a photographing apparatus such as a television camera has been connected to the operational circuit. The original picture is photographed by scanning the original with the television camera to obtain color separation picture signals. The obtained color separation picture signals are then processed in the operational circuit to obtain color separation reproduction signals. Then, the color separation reproduction signals are converted into fluorescent substance luminance signals for a display means such as a television monitor so as to reproduce a color picture image thereon. Thus, while the operator observes the color reproduction picture on the television monitor, he can determine the color control conditions for reproducing a color reproduction picture, which are to be set up to the color scanner when the color separation printing plates or films are prepared.

However, this kind of simulating means requires the additional operational circuit for the color scanner, in other words, substantially requires almost one more color scanner of a large size and of high cost.

SUMMARY OF THE INVENTION

Therefore, it is an object of the present invention to provide a color control simulator for a picture reproducing machine, free from the above described defects, which is compact, simple, stable and economical, and which is applicable to a color scanner, a color facsimile, television photography, electronic color proof press, and the like.

According to the present invention a color control simulator for a picture reproducing machine is provided comprising (a) an input means which scans an original picture to obtain color separation picture signals, (b) a memory storing a memory table indexed by the color separation picture signals to output first color-corrected color separation picture signals each of which is replaceable by a second color-corrected color separation picture signal, (c) a color control means which outputs the second color-corrected color separation picture signals to the memory when the first color-corrected color separation picture signals are replaced with the second color-corrected color separation picture signals, (d) a display means which displays colors corresponding to the color-corrected color separation picture signals fed from the memory, and (e) a computer which controls the input means, the memory, the color control means and the display means.

BRIEF DESCRIPTION OF DRAWINGS

In order that the present invention may be better understood, a preferred embodiment thereof will be described with reference to the accompanying drawings, in which.

DESCRIPTION OF A PREFERRED EMBODIMENT

Figure 1:
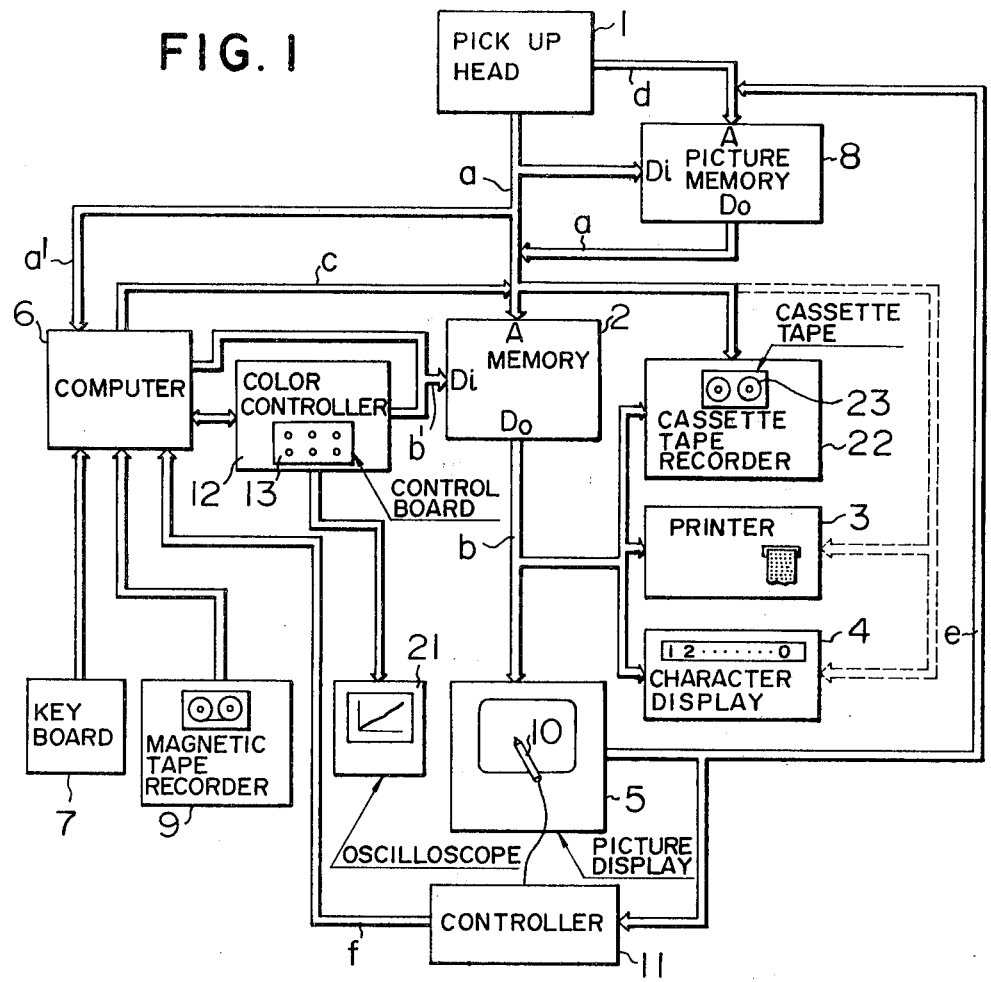
FIG. 1 is a block diagram of one embodiment of a color control simulator according to the present invention.

Referring now to the drawings there is shown in FIG. 1 one embodiment of a color control simulator for a picture reproducing machine such as a color scanner and a color facsimile.

A pickup head 1 of the same type as that used in a picture reproducing machine such as a color scanner which scans an original picture to obtain a set of color separation picture digital signals a. In this scanning operation, the scanning pitch and the sampling pitch in X and Y directions are adapted to be varied so that the scanning time may be shortened within acceptable ranges. The pickup head of the color scanner or the like may be used directly in this embodiment. A television camera may also be used for this scanning operation.

A set of color separation picture digital signals a comprises three color signals (R,G,B) representing the primary colors of red, green and blue, three color signals (Y,M,C) representing the primary colors of yellow, magenta and cyan, three color signals (H,V,C) representing the three color elements of hue, brightness and saturation, or the other set of color separation signals, and it is coded in a form of one word composed of a series of three primary color codes which represent a sampling point on the original picture.

In a memory 2 a basic color control memory table (not shown) for controlling color conditions such as a density range correction, color correction and gradation correction is stored. The color control table is indexed by the color separation picture digital signal a to output a color-corrected color separation picture digital signal b, as disclosed in Japanese Patent Publication No. 52-16403. The color-corrected color separation picture digital signal b is indicated as one word composed of a series of three primary color codes of three color signals (Y,M,C), (R,G,B), (H,V,C), or the others, like the color separation picture digital signal a.

The color-corrected signal b is sent from the output terminal Do of the memory 2 to a printer 3 and a character display 4, in which one word of the color-corrected signal b is displayed and the color corrected can be checked. If the corrected color of the corrected color signal b is expressed by a color table number of the Munsell system of colors, or the like, it can be readily checked.

Further, the color of the color-corrected signal b is also checked by displaying its color on a display means 5 such as a color cathode ray tube (CRT), or the like. For example, the color of one word of the signal b can be displayed on the entire surface of the display means 5, or one of areas divided of the surface of the display means 5 by a digital computer 6 or a digital processor.

The memory table stored in the memory 2 is also addressed by an address signal c instead of the color separation picture signal a, which is sent from the computer 6, and the address signal c is input to the computer 6 by a key board 7. That is, the color-corrected signal b is read out of the memory 2 by the address signal c supplied by the key board 7.

When the memory table in the memory 2 is addressed by the color separation picture signal a or the address signal c, in order to correct the color of a certain scanning point the color-corrected color separation picture signal b can be replaced with another color-corrected color separation picture signal b which is fed to the input terminal Di of the memory 2 via the computer 6 by the key board 7. The color-corrected color separation picture signal b replaced can be, of course, displayed in the printer 3, the character display 4 and the display means 5, as described above.

When there are not so many checking points on the original picture, whose color control conditions are simulated, the color correction operations by changing the color-corrected color separation picture signals b of the memory table in the memory 2 can be performed sufficiently by the key board 7. However, it takes plenty of time to carry out the simulation operation of the color control conditions of the entire area of the original picture by the key board 7.

In order to perform the simulation operation of the color control conditions of the entire area of the original picture, a picture memory 8 is used. That is, the color separation picture signals a obtained by scanning the entire surface of the original picture together with address signals d which represent the scanning positions, are once stored in the picture memory 8.

The color separation picture signals a corresponding to the entire area of the original picture are consecutively read out of the picture memory 8 to the memory 2 per each frame of the display means 5 by address signals e which are prepared from timing signals of the display means 5, and consecutively address the basic memory table having a desired characteristics curve stored in the memory 2. Then, the color-corrected color separation picture signals b corresponding to the color separation picture signals a are consecutively read out of the memory 2 and are fed to the display means 5, and thereby the display means 5 displaying the reproduction picture of the original picture as a soft copy.

A plurality of basic memory tables having the desired characteristics curves are prepared in advance and are stored in a magnetic memory or a magnetic tape recorder 9. One of the basic memory tables is selected and written in the memory 2 via the computer 6 prior to the operation, and, as occasion demands, the basic memory table stored in the memory 2 can be changed.

The selection of the basic memory table is performed while the reproduction picture displayed on the display means 5 is being observed so that the desired color tone may be obtained. When the desired color tone cannot be obtained, however, one basic memory table resembling the closest color tone to the desired color tone is selected, and the selected basic memory table is partly corrected.

For example, improper color points of the reproduction picture on the display means 5 are pointed out by a light pen 10, and then a light pen controller 11 connecting to the light pen 10 sends taking-in signals f to the computer 6. The computer 6 thereby takes in color separation picture signals a' corresponding to the positions pointed out by the light pen 10.

Then, the computer 6 sends the address signals c of the color separation picture signals a' to the memory 2, intervening between the scannings of the display means 5. While the address signals c address the memory table of the memory 2, the color-corrected color separation picture signals b stored in the addresses addressed by the address signals c are consecutively replaced with the other color-corrected color separation picture signals b' which are fed from a color controller 12 or the key board 7 via the computer 6.

The color controller 12 can control each of the three primary color codes of the one word of the color-corrected color separation picture signal b. For example, the one word of the color-corrected color separation picture signal b consists of a series of three color signal elements Y, M and C representing the primary ink colors of yellow, magenta and cyan, that is, one word of digital signal $(Y_b, m_b, c_b)$ of a series of yellow bits $y_b$, magenta bits $m_b$ and cyan bits $c_b$.

The color controller 12 is provided with a control board 13 for setting numerical values of the yellow bits $y_b$, the magenta bits $m_b$ and the cyan bits $c_b$. The control board 13 is formed in a similar construction to a color control board of a color scanner, and is adapted to settle color control conditions such as a density range correction, a color correction, and a gradation correction of each primary color element.

When the basic memory table stored in the memory 2 is partly corrected by the light pen 10, only the portions pointed out by the light pen 10 are replaced with the corrected numerical values settled on the control board 13. The corrected results can directly be checked by observing the display means 5, thereby setting the desired colors.

Further, the basic memory table in the memory 2 can be corrected by controlling the gradation characteristics over the entire surface of the reproduction picture shown on the display means 5 by using no light pen 10.

In this embodiment, if the color separation picture signal a and the color-corrected color separation picture signal b are expressed to the digital signals $(y_a, m_a, c_a)$ and $(y_b, m_b, c_b)$ of the series of yellow bits $y_a$ and $y_b$, magenta bits $m_a$ and $m_b$, and cyan bits $c_a$ and $c_b$ of three primary ink colors such as yellow, magenta and cyan, respectively, each color component bits $y_a$, $m_a$ or $c_a$ of the former picture signal a corresponds to that $y_b$, $m_b$ or $c_b$ of the latter picture signal b.

Therefore, when the basic memory table is corrected, the color component bits $y_b$, $m_b$ and $c_b$ of each color-corrected color separation picture signal b are replaced with the other color component bits $y_b'$, $m_b'$ and $c_b'$ of another color-corrected color separation picture signal b' which is fed from the color controller 12 into the memory 2.

For example, when the yellow components of the reproduction picture displayed on the display means 5 is corrected, the yellow component bits $y_b$ of the picture signals b are replaced with the other yellow component bits $y_b'$ of the picture signals b' in all points addressed by the yellow component bits $y_a$ of the picture signals a. In practice, the yellow component bits $y_b$ of the picture signals b are consecutively converted into the other yellow component bits $y_b'$ of the picture signals b' according to a gradation characteristics curve predetermined, while the yellow component bits $y_b$ are addressed by the yellow component bits $y_a$ of the picture signals a.

The desired gradation characteristics curve is, for example, prepared by a function generator, or the like of the color controller 12, and the numerical values of the gradation characteristics curve are set up on the control board 13. Such a control means is substantially the same as a color control means of the color scanner, or the like.

Figure 2:
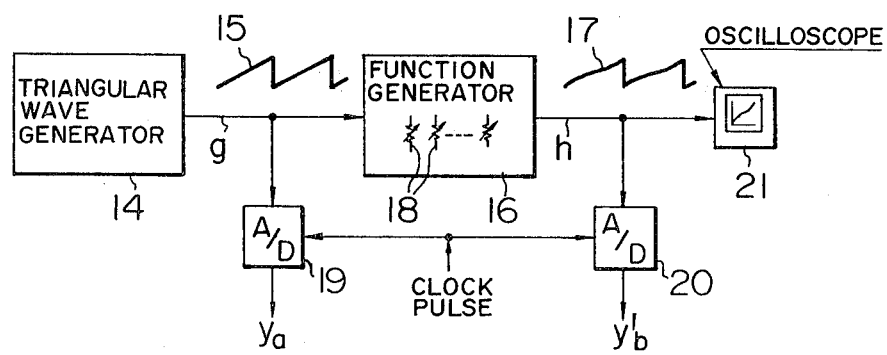
FIG. 2 is a block diagram of one embodiment of a color controller shown in FIG. 1.

In FIG. 2 there is shown one embodiment of the color controller 12 shown in FIG. 1. A triangular wave generator 14 generates a triangular wave g having linear slopes 15. The triangular wave g is fed to a function generator 16, and is reformed therein to a second triangular wave h having curved slopes 17 desired.

The function generator 16 is provided with a plurality of potentiometers 18 for adjusting the curved slopes 17 of the triangular wave h to the desired wave form, the potentiometers 18 with scales being arranged on the control board 13.

The function generator 16 is substantially the same as a color control circuit of the color scanner, or the like. The function generator 16 and the control board 13 are preferably formed in the same constructions and arrangements as those of the color scanner, or the like, whose color control conditions are simulated.

The triangular waves g and h output from the triangular wave generator 14 and the function generator 16 respectively are converted in analog-digital converters 19 and 20 in synchronization with clock pulses to obtain the yellow component bits $y_a$ of the color separation picture signal a and the yellow component bits $y_b'$ of the color-corrected color separation picture signal b'.

While the yellow component bits $y_a$ of the picture signal a are consecutively fed to the memory 2 as the address signals via the computer 6 and address the yellow component channel of the basic memory table of the memory 2, the yellow component bits $y_b'$ of the picture signals b' obtained are consecutively sent to the input terminal Di of the memory 2 and are stored in the yellow component channel of the addresses addressed by the yellow component bits $y_a$ of the picture signals a. This signal change or the signal correction is performed between the scanning operations of the frames of reproduction pictures on the display means 5, as described above.

From the above description it is apparent that the group of the yellow component bits $y_a$ or $y_b'$ of the picture signals a or b' constitute a table. Hence, a plurality of tables of color component bits are prepared in advance and are stored in the magnetic tape recorder 9. One of the tables is read out of the magnetic tape recorder 9 via the computer 6, as occasion requests.

The gradation characteristics curve, i.e. the curved wave form 17 of the triangular wave h is shown in an oscilloscope 21. This oscilloscope 21 may be utilized for observing the gradation characteristics curve of the table read out of the magnetic tape recorder 9.

The other color component bits $m_b'$ and $c_b'$ of the picture signals b' can be replaced with those $m_b$ and $c_b$ of the picture signals b in the same manner as described above.

Consequently, the basic memory table in the memory 2 is corrected by changing each color component bits, and the color control result is checked by observing the color-corrected reproduction picture displayed on the display means 5. The color control conditions can be checked by recording them in the printer 3 and the character display 4. Further, the partial color control results can be also checked by recording them in the printer 3 and the character display 4 by using the key board 7 or the light pen 10.

When the most proper color control conditions for the reproduction picture are obtained, the color-corrected memory table in the memory 2 is recorded in a cassette tape 23 by a cassette tape recorder 22, or in a floppy disk, a punch tape, or the like.

If the color-corrected color separation picture signals composed of a series of three additive primary color signals (R,G,B) representing red, green and blue are stored in the memory table in the memory 2, the color control simulator of the present invention can be utilized for the electronic color proof press, or the like.

Although the present invention has been described with reference to a preferred embodiment thereof, however, various changes and modifications can be made by those skilled in the art without departing from the scope of the present invention.

What is claimed is:

1. A color control simulator for a picture reproducing machine comprising an input means which scans an original picture to obtain color separation picture signals, a memory storing a memory table indexed by the color separation picture signals to output first color-corrected color separation picture signals, each of which is replaceable by a second color-corrected color separation picture signal, a color control means which outputs the second color-corrected color separation picture signals to the memory when the first color-corrected color separation picture signals are replaced with a second color-corrected color separation signals, a display means which displays color corresponding to the color-corrected color separation picture signals fed from the memory, and a computer which controls the input means, the memory, the control means and the display means;

the color control means being a color controller which comprises a triangular wave generator which generates a first triangular wave having linear slopes, a function generator which reforms from the first triangular wave to a second triangular wave having curved slopes, and analog digital converters for converting the first triangular wave and the second triangular wave into the digital picture signals to obtain the color separation picture signal and the second color-corrected color separation picture signal.

2. A simulator as defined in claim 1 wherein the input means is a pick-up head of the same type as that of the picture reproducing machine.

3. A simulator as defined in claim 1, wherein the input means is a television camera.

4. A simulator as defined in claim 2 or 3, wherein the color control means is a key board.

* * * * *